US011994057B1

(12) United States Patent
Zhang

(10) Patent No.: US 11,994,057 B1
(45) Date of Patent: May 28, 2024

(54) PRE-CHAMBER IGNITION DEVICE WITH VARIABLE VOLUME CAPABILITY FOR INTERNAL COMBUSTION ENGINES

(71) Applicant: ARAMCO SERVICES COMPANY, Houston, TX (US)

(72) Inventor: Anqi Zhang, Canton, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/358,766

(22) Filed: Jul. 25, 2023

(51) Int. Cl.
*F02B 19/18* (2006.01)
*F02B 19/06* (2006.01)
*F02B 19/12* (2006.01)
*F02B 75/02* (2006.01)

(52) U.S. Cl.
CPC .............. *F02B 19/06* (2013.01); *F02B 19/12* (2013.01); *F02B 19/18* (2013.01); *F02B 2075/027* (2013.01)

(58) Field of Classification Search
CPC .......... F02B 19/06; F02B 19/12; F02B 19/18; F02B 2075/027
USPC ................................ 123/259, 260, 286, 287
See application file for complete search history.

(56) References Cited

U.S. PATENT DOCUMENTS 4,187,808 A 2/1980 Audoux
6,354,250 B1 3/2002 Rodriguez Lopez
9,856,780 B2 1/2018 Pendlebury
9,970,400 B2 5/2018 Ge
10,161,296 B2 * 12/2018 Schock ............... F02B 19/1023
11,078,826 B1 * 8/2021 Chang ................ F02M 21/0275
11,187,142 B2 * 11/2021 Schock ................... F02B 19/18
2006/0219210 A1 10/2006 Bailey et al.
2014/0109865 A1 * 4/2014 Lee ......................... F02B 19/00 123/260
2014/0261298 A1 * 9/2014 Sasidharan ............. F02B 19/12 123/286

(Continued)

FOREIGN PATENT DOCUMENTS

JP 2012-97656 A 5/2012
JP 2012-219708 A 11/2012
WO 82/04462 A1 12/1982

OTHER PUBLICATIONS

Shah, Ashish, "Improving the Efficiency of Gas Engines using Pre-chamber Ignition"; Doctoral Thesis; Division of Combustion Engines, Department of Energy Sciences, Lund University; pp. i-74; Dec. 2015 (82 pages).

*Primary Examiner* — Hai H Huynh
(74) *Attorney, Agent, or Firm* — Osha Bergman Watanabe & Burton LLP

(57) ABSTRACT

An engine system includes a prechamber in fluid communication with a main chamber of an engine cylinder via a plurality of nozzles located along a first end of the prechamber. The engine system also includes a prechamber ignition device interfacing an interior of the prechamber, and a prechamber piston slidably disposed in the interior of the prechamber between the first end and a second end of the prechamber, wherein a variable volume is defined in the interior of the prechamber between the prechamber piston and the first end of the prechamber. The engine system further includes a spring positioned between the second end of the prechamber and the prechamber piston, wherein the spring is configured to exert a spring force on the prechamber piston.

17 Claims, 6 Drawing Sheets

(56) References Cited

U.S. PATENT DOCUMENTS

| | | | | |
|---|---|---|---|---|
| 2014/0331960 | A1* | 11/2014 | Lee | F02B 19/06<br>123/275 |
| 2016/0069250 | A1* | 3/2016 | Loetz | F02B 19/02<br>123/292 |
| 2016/0069251 | A1* | 3/2016 | Loetz | F02B 19/06<br>123/286 |
| 2019/0353088 | A1 | 11/2019 | Ketterer | |
| 2020/0116074 | A1* | 4/2020 | Chang | F02B 19/14 |
| 2021/0381869 | A1 | 12/2021 | Rabhi | |

* cited by examiner

PRE-CHAMBER IGNITION DEVICE WITH VARIABLE VOLUME CAPABILITY FOR INTERNAL COMBUSTION ENGINES

BACKGROUND

Internal combustion engines generally operate by combusting a fuel mixture within a combustion chamber, where the combustion of the fuel mixture forces movement of one or more components in the engine. A typical internal combustion engine includes multiple cylinders defining the combustion chambers within an engine block. In some situations, a fuel mixture is directed through an inlet valve into the cylinder and subsequently ignited to generate a combustion reaction. Within the cylinder, a combustion reaction actuates an internal piston, that acts on a crankshaft of the engine.

Combustion within a combustion chamber of an internal combustion engine may be generated using different mechanisms, such as using high pressure and/or high temperature conditions or using an ignition device. A common ignition device set up requires an ignition source, or spark, to be produced such that combustion is created by sparking an air and fuel mixture in the combustion chamber of the engine. Alternatively, a portion of the air and fuel mixture may be ignited in a pre-combustion chamber (also referred to as a prechamber), where the air and fuel mixture is ignited, and the resulting combustion reaction is released into the main combustion chamber to ignite the remainder of the air and fuel mixture.

Prechambers are used to combust a small quantity of fuel and produce turbulent jets, which can be ejected into the main combustion chamber to initiate combustion of the air and fuel mixture within the main combustion chamber. The turbulent jets provide distributed ignition sites that enable high burn rates of the air and fuel mixture in the main combustion chamber. Prechamber combustion can improve engine efficiency and reduce emission by providing fast combustion, better dilution tolerance, and lower knock tendency. However, prechambers may trap more residual gases than the main chamber and may have an optimal area to volume ratio which is dependent on engine operating conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an engine system. The engine system may include a prechamber in fluid communication with a main chamber of an engine cylinder via a plurality of nozzles located along a first end of the prechamber. The engine system may also include a prechamber ignition device interfacing an interior of the prechamber, and a prechamber piston slidably disposed in the interior of the prechamber between the first end and a second end of the prechamber, wherein a variable volume is defined in the interior of the prechamber between the prechamber piston and the first end of the prechamber. The engine system may further include a spring positioned between the second end of the prechamber and the prechamber piston, wherein the spring is configured to exert a spring force on the prechamber piston.

In another aspect, embodiments disclosed herein relate to an engine prechamber. The engine prechamber may include a body, which may be composed of a first end and a second end at opposite axial ends of the body, an inner side surface and an interior defined between the first end, the second end, and the inner side surface. The engine prechamber may also include a plurality of nozzles formed in the first end of the body, a prechamber piston slidably disposed in the interior of the body, and a spring positioned between the second end of the body and the prechamber piston. The engine prechamber may further include an ignition chamber in fluid communication with the interior of the body via an ignition chamber opening, wherein the ignition chamber opening is formed along the inner side surface of the body.

In yet another aspect, embodiments disclosed herein may relate to a method. The method may include providing an engine, where the engine includes a prechamber in fluid communication with a main chamber of an engine cylinder via a plurality of nozzles located along a first end of the prechamber, a primary piston slidably positioned in the engine cylinder, and a prechamber piston slidably positioned in the prechamber, wherein a variable volume is defined in an interior of the prechamber between the prechamber piston and the first end of the prechamber. The method may also include supplying a combustible mixture to the main chamber, compressing the combustible mixture within the main chamber during a compression stroke of the primary piston to direct a portion of the combustible mixture through the plurality of nozzles into the prechamber, and using the portion of the combustible mixture directed into the prechamber to move the prechamber piston in a first axial direction to increase the variable volume in the prechamber. The method may further include igniting the portion of the combustible mixture in the prechamber using an ignition device in fluid communication with the variable volume in the prechamber and jetting the ignited portion of the combustible mixture from the prechamber through the plurality of nozzles into the main chamber during an expansion stroke of the primary piston. The method may additionally include using a spring to move the prechamber piston in a second axial direction, opposite the first axial direction, to decrease the variable volume in the prechamber and to further eject the ignited portion of the combustible mixture out of the prechamber.

Other aspects and advantages of the claimed subject matter will be apparent from the following description and the appended claims.

DETAILED DESCRIPTION

In one aspect, embodiments disclosed herein relate to prechambers for use with an internal combustion engine.

Prechamber designs disclosed herein may include a variable volume that changes based on a movable prechamber piston positioned in the prechamber. The variable volume of the prechamber may be passively fueled with a combustion mixture (e.g., a mixture of fuel and air) from an adjacent main chamber of an engine cylinder through a plurality of nozzles in the prechamber, where the combustion mixture may be ignited in the prechamber using an ignition device (e.g., a spark plug). The ignited combustion mixture may then be jetted out of the prechamber, through the prechamber nozzles, and into the adjacent main chamber for combustion in the main chamber. In such manner, prechambers disclosed herein may act as a prechamber ignition device.

Figure 1:
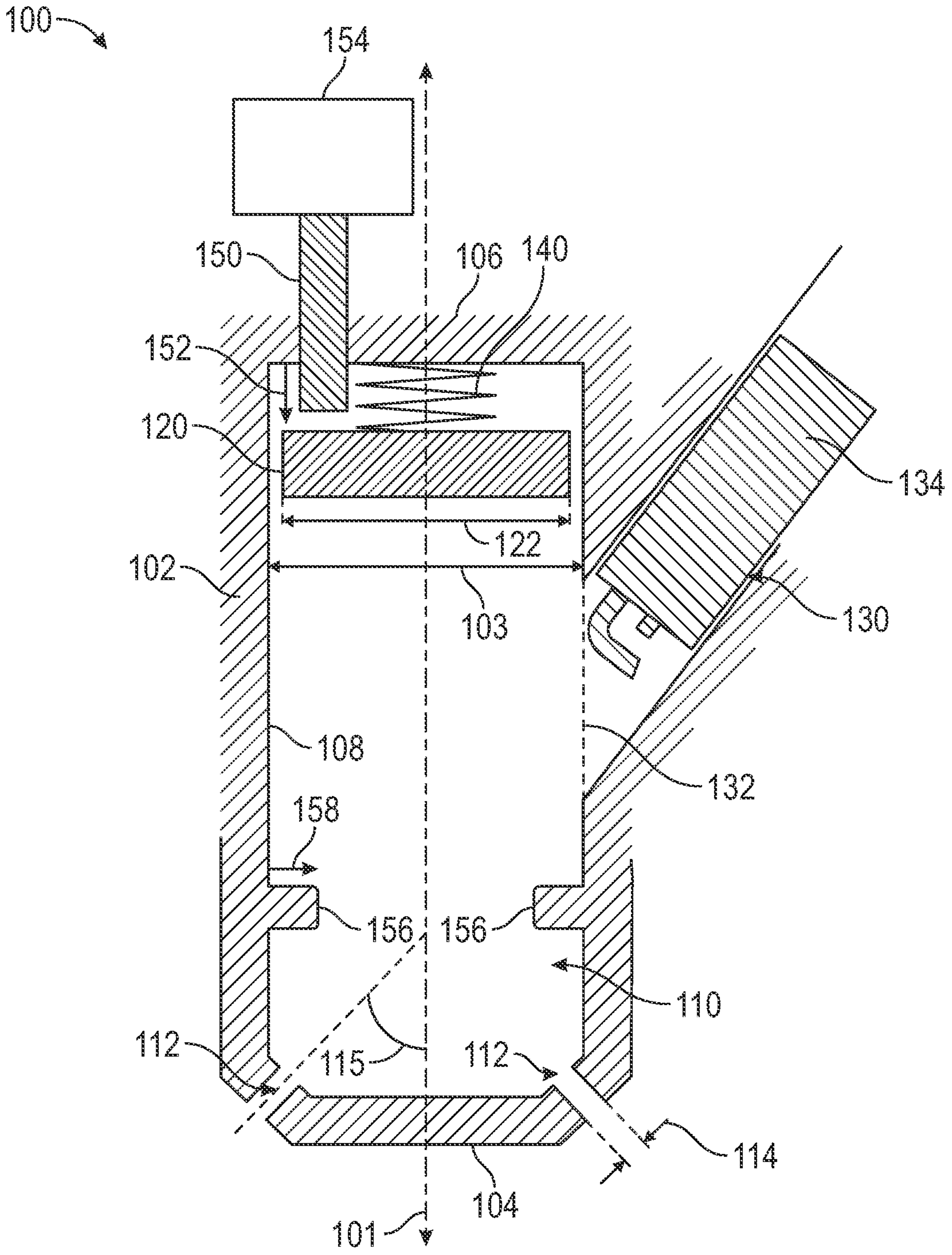
FIG. 1 shows a cross-sectional view of a prechamber in a first position according to embodiments of the present disclosure.
Figure 2:
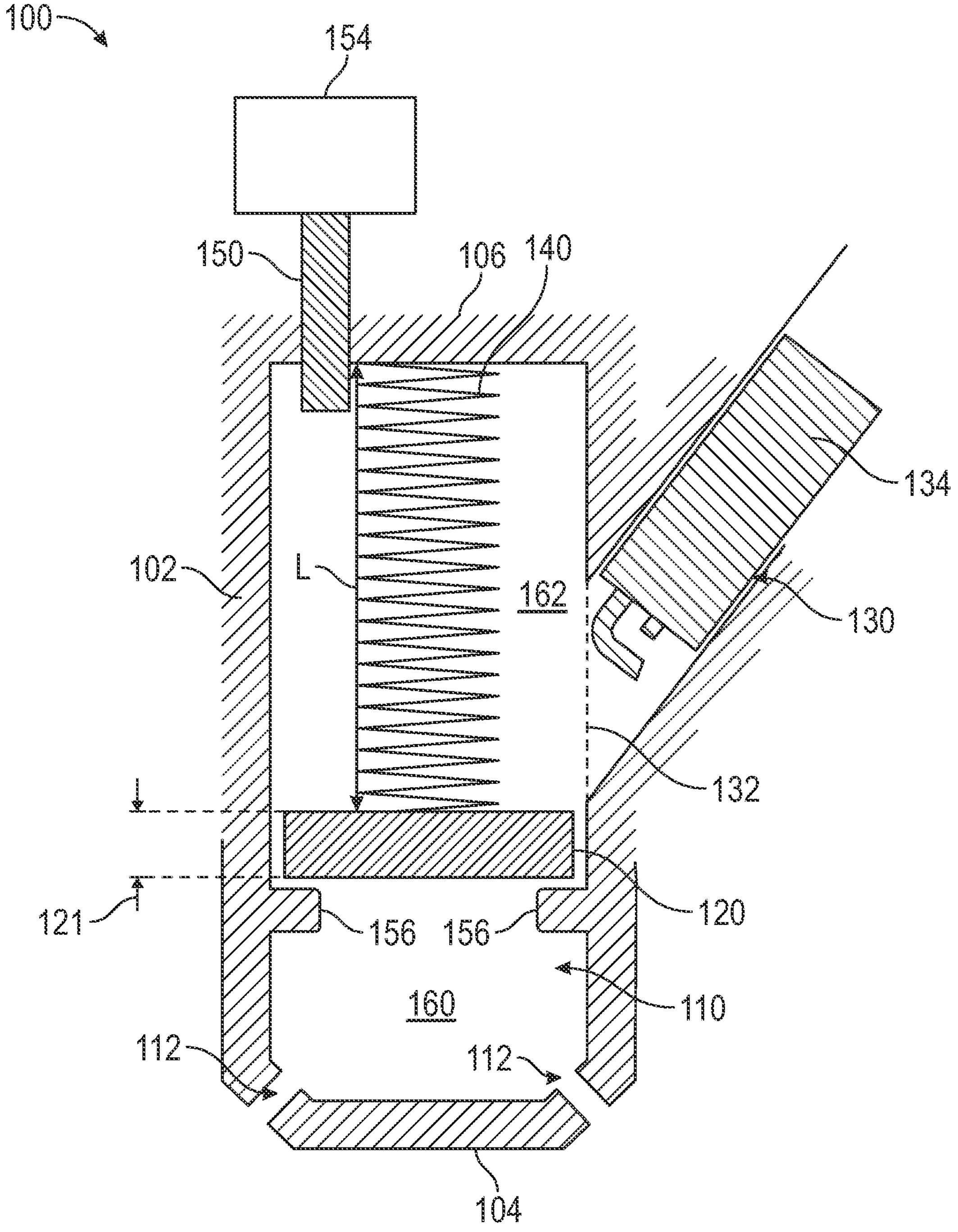
FIG. 2 shows the prechamber of FIG. 1 in a second position.

FIGS. 1 and 2 show an example of a prechamber 100 according to embodiments of the present disclosure at different stages during operation of the prechamber 100. The prechamber 100 has a body 102 with a first end 104 and a second end 106 at opposite axial ends of the body 102, an inner side surface 108 extending between the first and second ends, and an interior 110 defined between the first end 104, the second end 106, and the inner side surface 108. The body 102 may be formed integrally with an engine head (e.g., by machining the prechamber interior volume within the engine head) or may be formed separately from an engine head.

Figure 3:
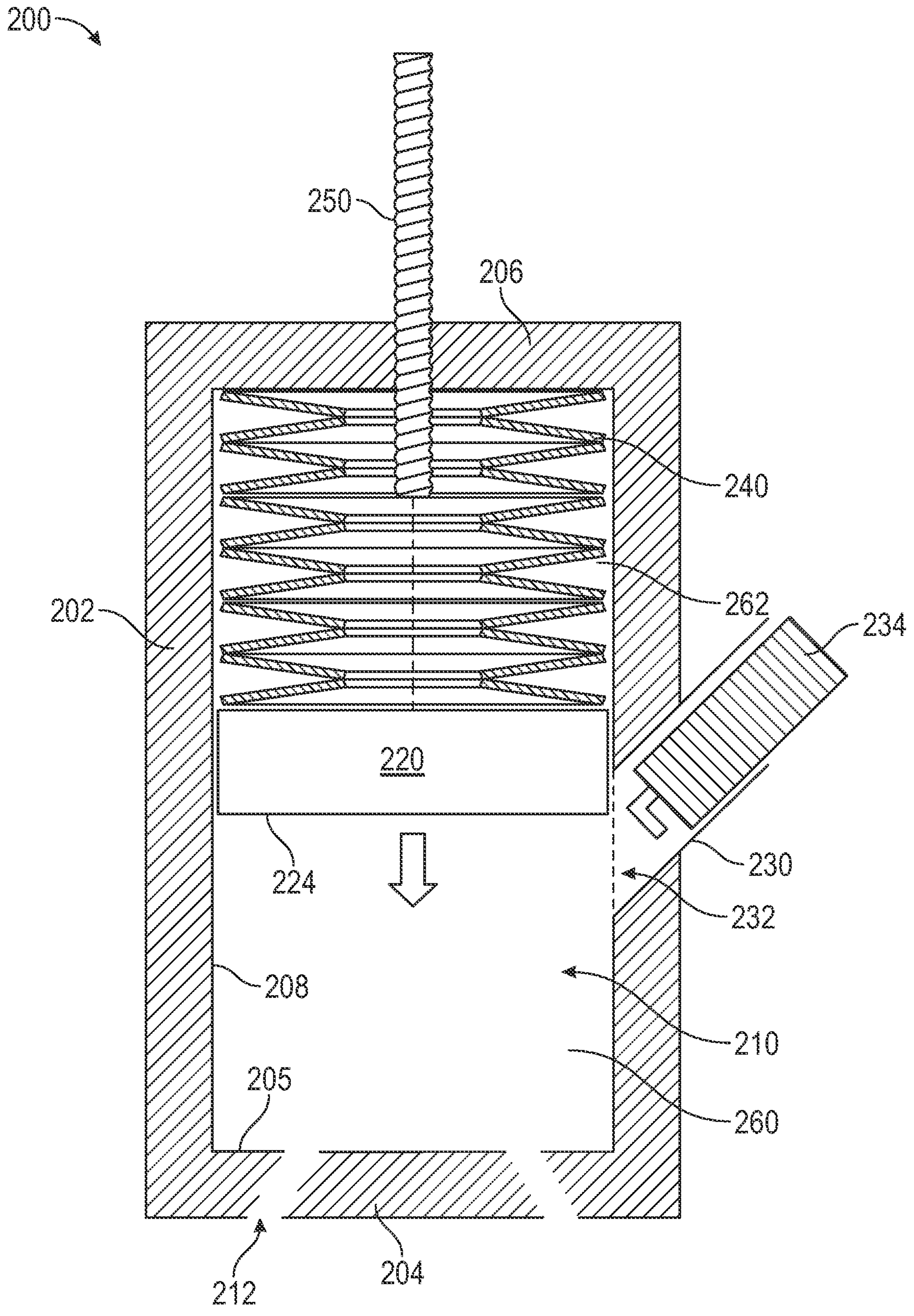
FIG. 3 shows a cross-sectional view of a prechamber according to embodiments of the present disclosure.

A plurality of nozzles 112 are formed in the first end 104 of the body to fluidly connect the interior 110 of the prechamber with an exterior environment. For example, when the prechamber 100 is assembled adjacent an engine cylinder, the nozzles 112 may fluidly connect the interior 110 of the prechamber with the cylinder's main chamber. The nozzles 112 may be formed, for example, by machining holes through the first end 104 of the body. The cross-sectional area at the outlet of each nozzle may be referred to as the nozzle's outlet area 114. According to one or more embodiments, the number of nozzles 112 formed in the prechamber body and the outlet area 114 of each nozzle 112 may be designed to provide the prechamber 100 with a total nozzle outlet area, where the total nozzle outlet area is equal to the sum of the outlet area of each nozzle in the prechamber. Additionally, in one or more embodiments, nozzles 112 may be oriented at different angles relative a central axis 101 of the prechamber 100. For example, as shown in FIGS. 1 and 2, the nozzles 112 may be oriented such that the flow path formed through each nozzle 112 extends at an angle 115 ranging between 0 and 45 degrees from the central axis 101. In some embodiments, angled nozzle orientation may be provided by forming nozzles perpendicularly through a non-planar first end surface, where the nozzle orientation may be provided by the angle of the wall through which the nozzle is formed, or by forming nozzles at an angle through a planar first end surface (e.g., as shown in FIG. 3, discussed below). In some embodiments, the angle 115 of orientation of the nozzles 112 may be varied to provide a larger spray area for fluid being jetted out of the nozzles 112 into an adjacent exterior environment, e.g., a main chamber of an engine cylinder.

A prechamber piston 120 is slidably disposed in the interior 110 of the body 102, where the prechamber piston 120 can slide back and forth in an axial direction between the first and second ends 104, 106 of the prechamber. The prechamber piston 120 may have a diameter 122 that is substantially equal to or slightly less than an inner diameter 103 of the inner side surface 108, such that the prechamber piston 120 may both seal against and slide along the inner side surface 108. In one or more embodiments, the body 102 of the prechamber may define a generally cylindrically shaped interior 110. In such embodiments, the prechamber piston 120 may have a cylindrical shape with a side surface that corresponds in size and curvature with the cylindrically shaped inner side surface 108 of the interior 110 to fit within and slide through the interior 110.

The prechamber 100 also includes an ignition chamber 130 in fluid communication with the interior 110 of the body 102 via an ignition chamber opening 132. In the embodiment shown, the ignition chamber opening 132 is formed along the inner side surface 108 of the body. Further, the ignition chamber opening 132 may be positioned along the inner side surface 108 at an axial position between the first end 104 of the prechamber and the prechamber piston 120 when the prechamber piston 120 is in a maximized position (where the prechamber piston 120 is located closest to the second end 106 during its axial movement through the prechamber 100). An ignition device 134 may be fitted into the ignition chamber 130 in an orientation that allows spark generation to be in fluid communication with the interior 110 of the body. For example, in the embodiment shown, the ignition device 134 is inserted into the ignition chamber 130 in an orientation having a spark generator (e.g., a gap in an electrical circuit) facing the ignition chamber opening 132. Further, the ignition device 134 is positioned in the ignition chamber 130 to where none of the ignition device 134 extends past the ignition chamber opening 132 into the interior 110 of the body 102. By holding the ignition device 134 entirely outside of the interior 110 of the body 102, the prechamber piston 120 is allowed to slide past the ignition chamber opening 132 without contacting the ignition device 134.

In the embodiment shown in FIGS. 1 and 2, the prechamber piston 120 slides axially through the interior 110 of the prechamber from a maximized position (shown in FIG. 1), where the prechamber piston 120 is located closest to the second end 106 during its axial movement through the prechamber 100, to a minimized position (shown in FIG. 2), where the prechamber piston 120 is located closest to the first end 104 during its axial movement through the prechamber 100. The maximized and minimized positions of the prechamber piston 120 may be designed by providing one or more mechanical stops from the first end 104 and/or second end 106 of the prechamber, such as an adjustable volume limiter and/or a stopper, as described below.

For example, in one or more embodiments, an adjustable volume limiter 150 is provided at the second end 106 of the prechamber. The adjustable volume limiter 150 extends an axial distance 152 into the interior of the prechamber from the second end 106, where the axial distance 152 may be adjusted. For example, when the adjustable volume limiter 150 is set in a first position, the adjustable volume limiter 150 extends a first axial distance from the second end 106, and when the adjustable volume limiter 150 is set in a second position, the adjustable volume limiter 150 extends a second axial distance from the second end 106 greater than the first axial distance. The axial distance 152 of the adjustable volume limiter 150 may be adjusted, for example, manually or using an actuator 154. In the embodiment shown, the adjustable volume limiter 150 has an elongated body that extends through the second end 106 of the body 102, where an exterior end of the adjustable volume limiter 150 is positioned outside of the prechamber interior 110 and connected to an actuator 154, and an interior end of the adjustable volume limiter 150 is positioned inside of the prechamber interior 110. The actuator 154 may axially move the adjustable volume limiter 150 through the second end 106 to extend or retract the axial distance 152 the adjustable volume limiter 150 extends from the second end 106.

In some embodiments, a stopper 156 is provided around the inner side surface 108 proximate the first end 104 of the prechamber 100. The stopper 156 extends a radial distance 158 into the interior 110 to define a reduced inner diameter of the interior that is less than the diameter 122 of the prechamber piston 120. Thus, when the prechamber piston 120 slides through the interior 110 of the prechamber toward the first end 104, the stopper 156 may stop the prechamber piston 120 before it reaches the first end 104 of the prechamber. In such manner, the stopper 156 may provide structural strength to the prechamber and slow excessive wear that would otherwise be caused by the prechamber piston 120 contacting the first end 104 of the prechamber 100 during each engine cycle. A stopper 156 may be integrally formed with the body 102 of the prechamber or may be connected to the inner side surface 108 of the prechamber. Additionally, a stopper may be formed of a single protrusion (e.g., which may extend circumferentially around part of or the entire perimeter of the inner side surface) or a stopper may be formed from multiple protrusions positioned circumferentially around the inner side surface along a shared axial plane.

The prechamber 100 also includes one or more springs 140 positioned between the second end 106 of the prechamber body and the prechamber piston 120. In some embodiments, the spring 140 may be directly or indirectly connected to the prechamber piston 120. The spring 140 may be arranged axisymmetrically about the central axis 101 to provide an axisymmetric spring force to the prechamber piston 120.

According to embodiments of the present disclosure, a spring may be selected to provide a desired spring stiffness. The spring stiffness may be represented by the spring constant k of the spring. Using Hooke's law, $F=-kx$, the displacement (x) of the spring is proportional to the deforming force (F) by the spring constant k. Thus, the force exerted by a spring on objects at its opposite axial ends is proportional to the spring's change in length away from its equilibrium length according to the spring constant and is biased towards its equilibrium position.

In one or more embodiments, a spring may be selected to have an equilibrium length (the length of the spring when the spring is at rest) that holds a prechamber piston at its minimized position (e.g., as shown in FIG. 2). For example, in the embodiment shown in FIG. 2, the prechamber piston 120 is at its minimized position when the prechamber piston 120 is contacting the stopper 156. In order to hold the prechamber piston 120 in its minimized position, the spring 140 may have an equilibrium length L greater than or equal to the axial distance between the second end 106 and the stopper 156 minus the height 121 of the piston 120. In other embodiments, where the prechamber does not include a stopper, a prechamber piston may be in its minimized position when the prechamber piston contacts the first end of the prechamber body (e.g., such as in the embodiment shown in FIG. 3). In such embodiments, the spring may have an equilibrium length greater than or equal to the axial distance between the second end and the first end minus the height of the piston 120.

In one or more embodiments, a spring with a predetermined spring constant may be selected based on an anticipated force acting on the prechamber piston due to a pressure differential (ΔP) in the prechamber. For example, as shown in FIG. 2, a prechamber piston 120 is fitted within a prechamber interior 110 to pressure seal a variable volume 160 formed between the prechamber piston 120 and the first end 104 from a second volume 162 formed between the prechamber piston 120 and the second end 106. The second volume 162 may be at ambient pressure (1 atm), and the variable volume 160, which is in fluid communication with an exterior of the prechamber via the nozzles 112, may be equal to the exterior pressure. Thus, when the prechamber 100 is assembled adjacent to and in fluid communication with a main chamber of an engine cylinder via the prechamber nozzles 112, the pressure in the variable volume 160 may be equal to the pressure in the adjacent cylinder's main chamber. An anticipated force acting on the prechamber piston due to a pressure differential (ΔP) may be calculated as the pressure differential (ΔP) times the cross-sectional area (A) of the prechamber piston. In addition to an anticipated pressure differential (ΔP) acting on the prechamber piston, gravity (G) and a normal force (N) imposed by contact against the adjustable volume limiter may be contributing forces acting on a prechamber piston and connected spring.

Using anticipated potential forces acting on the spring ($\Delta P \cdot A$, G, and N) and the change in spring length ($\Delta x$) as the prechamber piston moves between its maximized position and its minimized position, Hooke's relationship may be used to determine a range of suitable spring constants, as shown in the following equation:

$$G+N-\Delta P \cdot A=-k \cdot \Delta x$$

Assuming the normal force N acting on the spring is not negative, the upper limit of the spring constant k may be expressed as:

$$k \leq (1/\Delta x)(\Delta P \cdot A-G)$$

Because ΔP may be related to an engine's operating conditions when the prechamber is in fluid communication with a cylinder's main chamber, the upper limit of the spring constant k may be determined based on the anticipated range of the engine's operating conditions.

Referring now to FIG. 3, FIG. 3 shows another example of a prechamber 200 according to embodiments of the present disclosure. The prechamber 200 has a body 202 with a first end 204 and a second end 206 at opposite axial ends of the body 202, an inner side surface 208 extending between the first and second ends, and an interior 210 defined between the first end 204, the second end 206, and the inner side surface 208. A plurality of nozzles 112 are formed in the first end 104 of the body to fluidly connect the interior 110 of the prechamber with an exterior environment (e.g., an adjacent cylinder main chamber). A prechamber piston 220 is slidably disposed in the interior 210 of the body 202, where the prechamber piston 220 seals a variable volume 260 formed between a first side 224 of the piston and the first end 204 of the prechamber from a second volume 262 formed between the piston and the second end 206 of the prechamber.

An ignition chamber 230 is in fluid communication with the interior 210 of the prechamber, where the ignition chamber 230 is configured to hold an ignition device 234 in a position where the entire ignition device 234 is located outside the prechamber interior 210 but is in communication with the interior 210 through an ignition chamber opening 232. In such configuration, the prechamber piston 220 is able to slide past the ignition chamber opening 232 during operation while also allowing fluid in the interior of the prechamber to be ignited by the ignition device 234.

A single spring 240 is disposed in the second volume 262 and extends between the second end 206 and the prechamber piston 220. The spring 240 is coaxial with the central axis of the prechamber piston 220. In the embodiment shown in FIG. 3, the spring 240 has a diameter extends across the majority of the inner diameter of the prechamber interior 210, and thus also across the majority of the cross-sectional area of the piston. By providing a spring 240 that covers a majority of the cross-sectional area of the piston 220, more stability may be provided between the piston and the spring as the piston 220 slides back and forth through the interior 210 of the prechamber.

An adjustable volume limiter 250 is provided through the second end 206 of the prechamber and extends an axial distance into the prechamber interior 210. In the embodiment shown, the adjustable volume limiter 250 is positioned coaxial with the central axis of the prechamber piston 220 and with the spring 240, where the adjustable volume limiter 250 extends the axial distance through a central channel of the spring 240. For example, the spring 240 may be a disc spring (e.g., a Belleville spring) or a helical spring, for example, where the central channel is defined by the surrounding circumferential spring element(s) of the spring.

In one or more embodiments, the adjustable volume limiter 250 is adjustable to extend different axial distances into the interior 210 of the prechamber, as measured from an inner surface of the second end 206 of the prechamber. For example, as shown in FIG. 3, the adjustable volume limiter 250 has a threaded portion, which may threadably mate with internal threads formed through the second end 206 of the prechamber. In such embodiments, the adjustable volume limiter 250 is threaded into or out of the internal threads of the second end 206 in order to adjust the axial distance of extension into the prechamber interior 210. The adjustable volume limiter 250 may be screwed into/out of the second end 206 manually or using an electronically controlled actuator, for example.

The prechamber piston 220 is slidable between a minimized position, where the prechamber piston 220 is proximate the nozzles 212, and a maximized position, where the prechamber piston 220 contacts (and is limited in axial movement by) the adjustable volume limiter 250. In one or more embodiments, the minimized position of a prechamber piston 220 is where the prechamber piston 220 contacts an inner surface 205 of the first end 204. For example, in the embodiment shown, the first side 224 of the prechamber piston 220 has a surface geometry that mates with the inner surface 205 of the prechamber first end 204 when the prechamber piston 220 is in its minimized position. By designing the minimized position of the prechamber piston 220 to contact the inner surface of the prechamber first end 204 (e.g., to contact a mechanical stop on the inner surface or mate with the inner surface), the prechamber piston 220 may expunge a relatively greater volume of fluids (e.g., combustion products, residual gases) from the prechamber, out the nozzles 212.

Additionally, the maximized position of a prechamber piston 220 may be set by the adjustable volume limiter 250. Accordingly, the variable volume 260 formed between the first side 224 of the piston and the first end 204 of the prechamber, when the piston is at its maximized position, may also be adjusted by moving the adjustable volume limiter 250 to extend different axial distances from the second end 206. The variable volume 260, as measured when the prechamber piston 220 is at its maximized position, may be selected to optimize performance of the prechamber under different engine operating conditions.

A ratio of the total outlet area of the nozzles 212 to the variable volume 260 is referred to herein as the A/V ratio (AVR). As discussed above, the nozzles 212 may be designed to provide a total nozzle outlet area (the sum of the outlet area of each nozzle in the prechamber), where the total nozzle outlet area is a fixed value in the calculation of the AVR. The AVR varies during each engine operation cycle as the prechamber piston 220 moves between the adjustable volume limiter 250 and the first end 204 of the prechamber. The minimum value of the AVR (AVRmin), when the prechamber piston is at its maximized position, is a key design metric that dictates the strength of the jet combustion. In some embodiments, a prechamber may be designed to provide a selected range of the AVRmin, where the upper limit of the AVRmin range is reached when the adjustable volume limiter 250 is set to extend a maximum axial distance into the prechamber interior, and where the lower limit of the AVRmin range is reached when the adjustable volume limiter 250 is set to extend a minimum axial distance into the prechamber interior. In one or more embodiments, the AVRmin may range, for example, from 1 $m^{-1}$ to 20 $m^{-1}$. In one or more embodiments, the AVRmin may be variable as engine speed and load varies by adjusting the adjustable volume limiter. Thus, the variable volume 260 is variable in two ways: 1) the variable volume 260 changes volume as the prechamber piston 220 moves back and forth within the prechamber, and 2) the range of motion of the prechamber piston 220 (and AVRmin) may be changed by moving the adjustable volume limiter 250.

Figure 4:
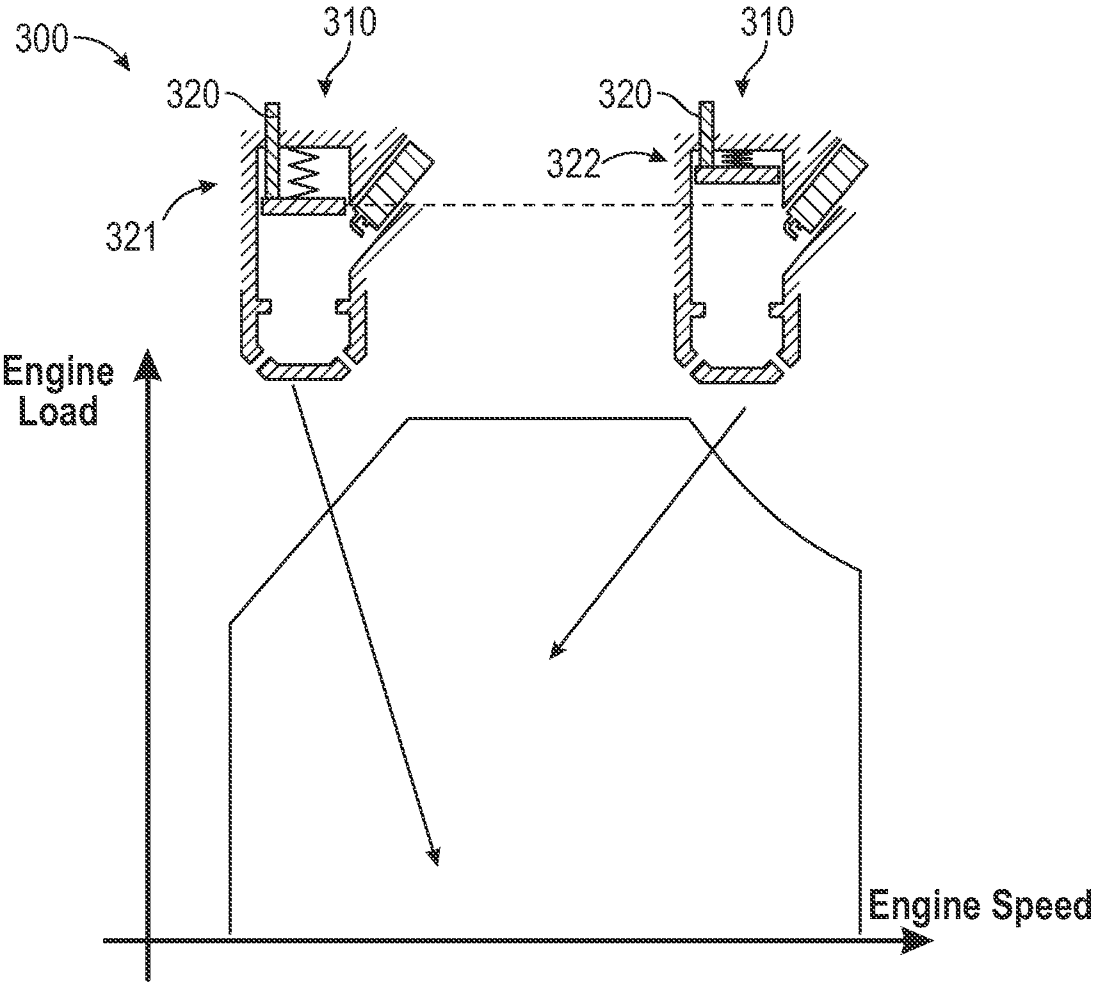
FIG. 4 shows an example of an engine operating map, including prechamber settings, according to embodiments of the present disclosure.

An AVRmin range may be selected according to selected engine operating conditions. For example, FIG. 4 shows an example of an engine operating map 300, where a range for the AVRmin of a prechamber 310 may be selected according to selected engine load and engine speed during operation of the engine. The range of the AVRmin may be adjusted between an upper limit, shown in the prechamber configuration 321, where the adjustable volume limiter 320 is extended a maximum axial distance into the prechamber 310, and a lower limit, shown in the prechamber configuration 322, where the adjustable volume limiter 320 is extended a minimum axial distance into the prechamber 310. In one or more embodiments, a relatively large value AVRmin for the prechamber 310 may be selected when an engine is operating in the bottom quartile of its range of engine load and speed operations, while a relatively small value AVRmin for the prechamber 310 may be selected when the engine is operating in the upper quartile of its range of engine load and speed capabilities. As shown in FIG. 4, the upper limit AVRmin prechamber configuration 321 may be provided at relatively low engine loads and speeds by adjusting the adjustable volume limiter 320 to extend a maximum axial distance into the prechamber, and the lower limit AVRmin prechamber configuration 322 may be provided at relatively high engine loads and speeds by adjusting the adjustable volume limiter 320 to extend a minimum axial distance into the prechamber.

In one or more embodiments, the A/V ratio may be strongly dependent on engine load, with a lesser dependence on engine speed. In particular, at higher engine loads, the combustion chamber gas may become denser, resulting in a requirement for stronger jets. In one or more embodiments, the A/V ratio may be adjusted dynamically and continuously using a capable actuator for the adjustable volume limiter 320 in order to offer the greatest opportunity for optimization.

Figure 5:
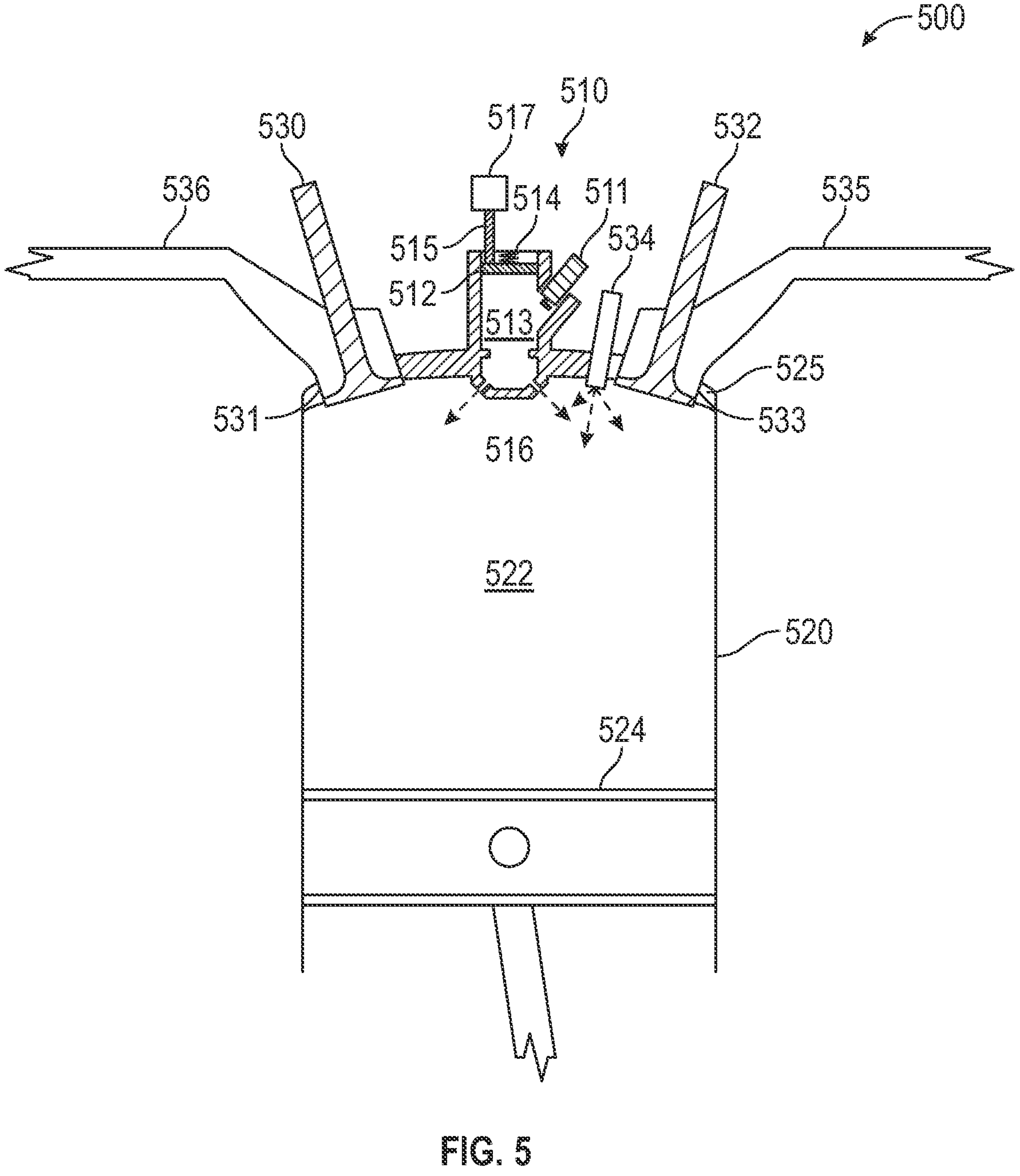
FIG. 5 shows part of an engine system according to embodiments of the present disclosure.

According to embodiments of the present disclosure, one or more prechambers may be part of an engine system, where each prechamber is in fluid communication with a main chamber of an engine cylinder via a plurality of nozzles. FIG. 5 shows an example of an engine 500 having a prechamber 510 according to embodiments of the present disclosure in fluid communication with a main chamber 522 of a cylinder 520. Components of the engine 500 may be formed of aluminum, iron, steel, or equivalent metals used in conventional engine design known to a person of ordinary skill in the art.

The prechamber 510 includes a prechamber piston 512 slidably disposed in the interior of the prechamber, where a variable volume 513 is defined in the interior of the prechamber between the prechamber piston and the first end of the prechamber. A spring 514 is positioned on the opposite side of the piston from the variable volume 513, where the spring 514 is configured to exert a spring force on the prechamber piston 512 biasing the prechamber piston 512 to a minimized position within the prechamber 510. Additionally, a prechamber ignition device 511 is positioned in an ignition chamber to be in communication with the variable volume 513 when the prechamber piston 512 is in a maximized position.

The engine cylinder 520 may be formed within an engine body or engine block. For ease of illustration, a single cylinder 520 is shown. However, the engine 500 may have multiple cylinders, for example, 2-16 cylinders, which may be arranged, for example, in an inline configuration, a v-configuration, or a flat-plane configuration. Each cylinder 520 includes a main chamber 522 and a primary piston 524 slidably positioned in the cylinder 520. The main chamber 522 is the enclosed space within the cylinder 520 defined between the piston head and upper end of the cylinder 520. Thus, as the primary piston 524 slides back and forth within the cylinder 520, the volume of the main chamber 522 changes.

The primary piston 524 is connected by a connecting rod to a crankshaft, which converts a reciprocating motion of the primary piston 524 into rotary motion of the crankshaft. The primary piston 524 is arranged to move back and forth within the cylinder 520, from a top dead center position (TDC) position (in which the piston is at the top of its stroke and the piston head is farthest away from the crankshaft) to a bottom dead center (BDC) position (in which the piston is at the bottom of its stroke and the piston head is closest to the crankshaft). The compression ratio of the cylinder 520 is the ratio of the total volume of the main chamber 522 when the primary piston 524 is at BDC position to the clearance volume of the main chamber 522. The clearance volume is the volume of the main chamber 522 when the primary piston 524 is at TDC position. The clearance volume may include the space between the primary piston and the upper end of the cylinder 520, the volume of any interfacing valves and valve pockets (e.g., from intake and exhaust valves), and any added clearance. Thus, the compression ratio may be expressed by the equation: $CR=(Vs+Vc)/Vc$, where CR is compression ratio; Vs is the sweep volume (the volume of the main chamber through which the piston moves from BDC to TDC, also sometimes referred to as the displacement volume); and Vc is the clearance volume.

According to embodiments of the present disclosure, the compression ratio of the engine cylinder 520 is fixed, while the A/V ratio of the prechamber 510, as described above, may be varied during operation of the engine 500. For example, the A/V ratio of the prechamber 510 may be varied by moving an adjustable volume limiter 515, e.g., using an actuator 517, to extend different axial distances into the interior of the prechamber.

The upper end of the cylinder may be formed by an engine head 525, and the cylinder 520 may be formed in an engine block, where the engine head 525 is mounted to the engine block to enclose the main chamber 522. In such embodiments, the main chamber 522 is defined between the primary piston 524, the engine block cylinder 520, and the engine head 525. The prechamber 510 body may be integrally formed in the engine head 525 or may be connected to the engine head, such that the nozzles 516 of the prechamber 510 fluidly connect the variable volume 513 of the prechamber with the main chamber 522 of the cylinder 520.

The prechamber 510 is provided at the upper end of the cylinder 520 in an orientation where the prechamber piston 512 and the primary piston 524 are slidable in parallel axial directions. In some embodiments, the prechamber piston 512 may be coaxial with the primary piston 524.

Additionally, in one or more embodiments, a prechamber may have an interior with a volume that is less than 10 percent of the clearance volume of an adjacent engine cylinder. For example, in the embodiment shown in FIG. 5, the main chamber 522 of the cylinder 520 includes a clearance volume defined between the engine head 525 and the primary piston 524 when the primary piston 524 is in a TDC position within the engine cylinder 520. Although not drawn to scale, the prechamber interior (defined between the opposite first and second ends and the inner side surface of the prechamber) has a volume that is less than 10 percent of the clearance volume in the cylinder 520. Accordingly, because the variable volume 513 (defined between the prechamber piston, the first end, and the inner side surface of the prechamber) is less than the prechamber's interior volume, the variable volume 513 is also less than 10 percent of the clearance volume in the cylinder 520.

The engine 500 further includes an exhaust valve 530 positioned in an exhaust port 531 of the cylinder 520. According to embodiments of the present disclosure, each cylinder in an engine may have a single exhaust port and associated exhaust valve, or a cylinder may have two exhaust ports each with an associated exhaust valve. The engine 500 also includes an intake valve 532 positioned in an intake port 533 of each cylinder 520 in the engine 500. According to embodiments of the present disclosure, a cylinder may have a single intake port and associated intake valve, or a cylinder may have two intake ports each with an associated intake valve. Exhaust valves and intake valves may each be actuated by a valve actuator known in the art. Additionally, a fuel injector 534 may be positioned adjacent to and interfacing with each cylinder 520, such that fuel may be injected from the fuel injector 534 into the main chamber 522 of the cylinder 520. The fuel injector 534, a fuel supply (not shown), and components such as valves and flowlines used to supply fuel from the fuel supply to the fuel injector 534 may form at least part of a fuel system of the engine. The intake and exhaust valves 532, 530 and fuel injector 534 may be provided at the upper end of the cylinder 520, around the prechamber 510.

Air may be flowed into the main chamber 522 through one or more intake valves 532 when the intake valve(s) are actuated to an open position, and air flow into the main chamber 522 may be stopped by actuating the intake valve (s) to a closed position. Similarly, exhaust gases may be flowed out of the main chamber 522 through one or more exhaust valves 530 when the exhaust valve(s) are actuated to an open position, and exhaust flow out of the main chamber 522 may be stopped by actuating the exhaust valve(s) to a closed position. The intake valve(s) and exhaust valve(s) to each cylinder 520 in the engine 500 may be actuated to open and closed positions according to an engine valve timing schedule.

The intake ports 533 are fluidly connected to an intake system of the engine 500. The intake system may include an assembly of flowlines, valves, and/or other components that can receive air from the ambient environment around the engine and direct the air flow through at least one intake line 535 to the intake port(s) 533 of the engine 500. For example, in addition to the at least one intake line 535 and the intake valves 532, an intake system may include at least one of an intake manifold, a charge air cooler, an intake flowline valve, a throttle, and other components that regulate and/or change the physical properties of the intake air. In one or more embodiments, intake line(s) 535 may be fluidly connected to intake ports 533 of multiple cylinders 520 via an intake manifold. An intake manifold may include multiple intake branches that extend from the multiple intake ports and merge to connect to the intake line 535.

The exhaust ports 531 are fluidly connected to an exhaust system of the engine 500. The exhaust system may include an assembly of flowlines, valves, and/or other components that can receive exhaust outputted from the main chamber 522 through the exhaust port 531 and at least one exhaust line 536, where the exhaust may be further directed to exhaust system components for reuse (e.g., in an exhaust gas recirculation (EGR) system) or for ejection from the system. For example, in addition to the at least one exhaust line 536 and the exhaust valves 530, an exhaust system may include at least one of an exhaust manifold, an exhaust flowline valve, and other components that regulate and/or change the physical properties of the exhaust. In one or more embodiments, exhaust line(s) 536 may be fluidly connected to exhaust ports 531 of multiple cylinders 520 via an exhaust manifold. An exhaust manifold may include multiple exhaust branches that extend from the multiple exhaust ports and merge to connect to the exhaust line 536.

Figure 6:
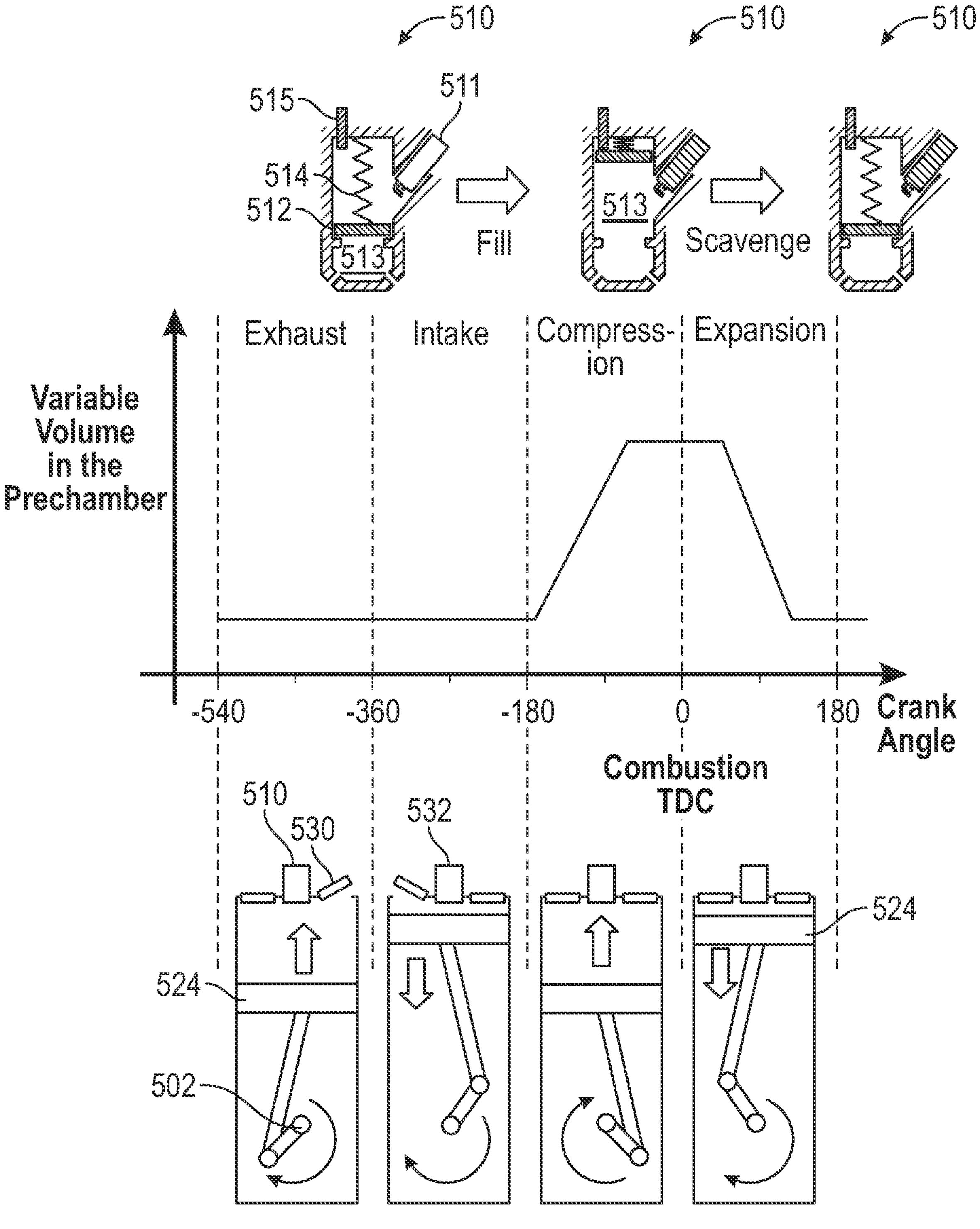
FIG. 6 shows a schematic diagram of an engine timing schedule according to embodiments of the present disclosure.

Methods according to embodiments of the present disclosure are described below referring to the engine 500 shown in FIG. 5 and timing schedule shown in FIG. 6 as an example. However, the disclosed methods may be implemented using other engine and prechamber systems according to embodiments of the present disclosure.

According to embodiments of the present disclosure, methods for operating an engine may include providing an engine 500 having a prechamber 510 in fluid communication with a main chamber 522 of an engine cylinder 520 via a plurality of nozzles 516 located along a first end of the prechamber 510. A primary piston 524 is slidably positioned in the engine cylinder 520, wherein the main chamber 522 is defined between the primary piston 524 and the upper end of the cylinder 520. A prechamber piston 512 is slidably positioned in the prechamber 510, wherein a variable volume 513 is defined in an interior of the prechamber between the prechamber piston 512 and the first end of the prechamber. Because the variable volume 513 of the prechamber is fluidly connected with the main chamber 522 via the prechamber nozzles 516, the variable volume pressure may be substantially equal with the main chamber pressure.

The engine 500 may be operated using a four-stroke piston cycle. For example, as shown in the engine operating schedule in FIG. 6, the primary piston 524 moves back and forth within the cylinder 520 according to the four-stroke cycle including an exhaust stroke, an intake stroke, a compression stroke, and an expansion stroke. The four-stroke cycle of the primary piston 524 corresponds with the crank angle of the connected crankshaft 502. As the primary piston 524 moves back and forth, changing the volume of the main chamber 522, the fluidly connected variable volume 513 in the prechamber 510 may also change based on the pressure in the main chamber 522. FIG. 6 shows a graphical representation of the change in the variable volume of the prechamber 510 along the change in crankshaft angle, with corresponding diagrams of the prechamber and primary pistons.

During an exhaust stroke of the primary piston 524, the exhaust valve 530 to the main chamber 522 is open and the primary piston 524 moves towards the prechamber 510 to push contents in the main chamber 522 through the exhaust valve 530. With the contents being directed through the open exhaust valve 530, the main chamber pressure, and thus the pressure in the fluidly connected variable volume, is not high enough to overcome the spring constant of the spring 514 holding the prechamber piston 512 in a minimized position.

During an intake stroke of the primary piston 524, a combustible mixture is supplied to the main chamber 522. For example, a combustible mixture may include a mixture of air and fuel. During the intake stroke, the intake valve 532 to the main chamber 522 is open and the primary piston 524 moves away from the prechamber 510 to receive the combustible mixture. The combustible mixture may be supplied to the main chamber 522 by directing air from an intake system through the intake valve 532, when in an open position, and mixing the air in the main chamber 522 with fuel injected into the main chamber 522 via a fuel injector 534. During the intake stroke, the main chamber pressure, and thus the pressure in the fluidly connected variable volume, is not high enough to overcome the spring constant of the spring 514 holding the prechamber piston 512 in a minimized position. Thus, as shown in FIG. 6, during the exhaust stroke and the intake stroke, the spring 514 holds the prechamber piston 512 to provide the variable volume 513 with a minimum volume.

After the intake valve 532 closes, the engine cylinder pressure increases during the subsequent compression stroke. Namely, during a compression stroke of the primary piston 524, the primary piston 524 moves from BDC towards TDC to compress the combustible mixture within the main chamber 522 while the intake and exhaust valves are closed. Compression of the combustible mixture in the main chamber 522 directs a portion of the combustible mixture through the nozzles 516 into the variable volume 513 of the prechamber 510. The portion of the combustible mixture directed into the variable volume 513 increases the pressure in the variable volume. Further, the increased pressure in the variable volume works against the spring 514 in the prechamber and moves the prechamber piston 512 in a first axial direction (away from the nozzles) to increase the variable volume 513 in the prechamber and fill combustible mixture into the prechamber. In such manner, the prechamber 510 may be passively fueled by the portion of the combustible mixture entering the variable volume 513 from the main chamber, without direct fuel injection into the variable volume 513.

The increased variable volume pressure moves the prechamber piston in the first axial direction until the ignition device 511 is in fluid communication with the variable volume 513. Combustion induced high pressure may keep the prechamber piston 512 in its maximized position for a short period of time.

The portion of the combustible mixture in the prechamber variable volume may then be ignited using the ignition device while the ignition device is in fluid communication with the variable volume. In one or more embodiments, the ignition device may be electrically activated automatically to create a spark according to an engine timing schedule. In some embodiments, the ignition device 511 may be activated when the prechamber piston 512 is in a maximized position.

When the portion of the combustible mixture in the variable volume 513 of the prechamber 510 is ignited, it combusts, from which ignited portions of the combustible mixture are jetted from the prechamber 510 through the nozzles 516 into the main chamber 522. Jetting ignited portions of the combustible mixture into the main chamber 522 may then ignite the combustible mixture in the main chamber 522. Combustion in the main chamber 522 moves the primary piston 524 in a direction from TDC to BDC in the expansion stroke of the primary piston 524.

Additionally, with the reduction of pressure in the variable volume of the prechamber during the expansion stroke, the spring 514 in the prechamber may move the prechamber piston 512 in a second axial direction, opposite the first axial direction, to decrease the variable volume 513 in the prechamber and to further eject the ignited portion of the combustible mixture out of the prechamber.

In one or more methods according to embodiments of the present disclosure, fuel may be passively flowed into the prechamber through the prechamber nozzles using pressure changes in the main chamber as the primary piston moves toward the prechamber (pushing a fuel mixture from the main chamber, through the nozzles, into the prechamber), and combustion products may be flowed out of the prechamber through the nozzles as the primary piston moves away from the prechamber (suctioning contents of the prechamber through the nozzles into the main chamber). Additionally, by using an engine with a prechamber according to embodiments of the present disclosure, a spring force may be used to scavenge remaining combustion products out of the prechamber.

Additionally, in one or more embodiments, methods of operating an engine with a prechamber according to embodiments of the present disclosure may include adjusting an adjustable volume limiter in the prechamber to alter the A/V ratio of the prechamber. For example, the adjustable volume limiter in the prechamber may be adjusted to alter the A/V ratio of the prechamber according to preselected engine operating conditions, such as preselected engine operating loads and/or preselected engine operating speeds. In one or more embodiments, an electronically controlled actuator may be used to adjust the adjustable volume limiter.

For example, referring back to FIG. 4, in one or more embodiments, an adjustable volume limiter 320 may be adjusted between a first position (extending a first axial distance into the prechamber interior) and a second position (extending a second axial distance greater than the first axial distance into the prechamber interior), where the first and second positions may be preselected according to preselected engine operating conditions. When the engine is operating in a first engine load range, the adjustable volume limiter may be set in the first position. When the engine is operating in a second engine load range, less than the first engine load range, the adjustable volume limiter may be set in the second position. Moving the adjustable volume limiter between the first and second positions alters the maximum variable volume in the prechamber, which alters the prechamber's A/V ratio. While the A/V ratio of the prechamber may be altered during operating of the engine, the compression ratio of the engine cylinder remains fixed.

Ignition of a combustible mixture within the variable volume of the prechamber creates a front of burning fuel that is jetted through the prechamber nozzles and into an adjacent main chamber. The combustion jetting out of the nozzles may be sufficient to cause complete combustion of the combustible mixture within the main chamber. However, as engine load changes, the amount and momentum of a jetted combustion from the prechamber may not be optimal for the different engine loads. Limitations from conventionally designed prechambers have been observed as resulting from a prechamber with a fixed volume and nozzle outlet area (fixed A/V ratio), demonstrating that the A/V ratio of a prechamber has a dominant impact on the prechamber's combustion enhancement performance. However, the optimal A/V ratio may vary depending on the engine operating conditions, such as engine load. As a result, a conventional prechamber geometry optimized for high load operations could potentially induce deteriorated performance under low loads. By using prechamber designs disclosed herein, where the pre-combustion volume of the prechamber may vary based on the positioning of an adjustable volume limiter, the A/V ratio of the prechamber may be optimized and adjusted based on the engine operating conditions. Thus, by varying the A/V ratio of the prechamber, the amount and momentum of combustion from the prechamber ejected into the main chamber may be optimized according to the changing engine loads, which may reduce engine knock and improve ignition response, for example.

Additionally, prechambers designed to ignite a combustion mixture in an adjacent cylinder main chamber have demonstrated the potential to improve engine combustion efficiency. However, such benefits of conventionally designed prechambers are mostly in a limited range on the engine's speed/load map. For example, conventionally designed prechambers have shown restricted gas exchange around spark plugs. Additionally, a certain portion of the combustion product is often trapped within conventional prechambers during continuous engine operation. Such insufficient scavenging imposes ignition difficulties at conditions that require high levels of dilution, thus diminishing any potential benefits of the turbulent jet combustion. By using a movable prechamber piston in the prechamber, as disclosed herein, the prechamber piston may be used to scavenge and eject residual contents from the prechamber. Additionally, in contrast to conventionally designed prechambers that use active fuel and air injection into the prechamber to expunge residuals, which have complex system designs and increased hardware cost (e.g., due to fitting a fuel injector to interface with the prechamber volume), movable prechamber piston designs disclosed herein may expunge residuals from the prechamber using minimal mechanical components, such as one or more springs configured to move the prechamber piston.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. An engine system, comprising:

a prechamber in fluid communication with a main chamber of an engine cylinder via a plurality of nozzles located along a first end of the prechamber;

a prechamber ignition device interfacing an interior of the prechamber;

a prechamber piston slidably disposed in the interior of the prechamber between the first end and a second end of the prechamber, wherein a variable volume is defined in the interior of the prechamber between the prechamber piston and the first end of the prechamber;

a spring positioned between the second end of the prechamber and the prechamber piston, wherein the spring is configured to exert a spring force on the prechamber piston; and an adjustable volume limiter is provided at the second end of the prechamber, wherein an AVR is a ratio of a total outlet area of the plurality of nozzles to a volume of the variable volume, wherein an AVRmin is a minimum value of the AVR when the prechamber piston is closest to the second end of the prechamber, wherein the AVRmin ranges from a lower limit to an upper limit, the lower limit being when the adjustable volume limiter is set in a first position extending a minimum axial distance from the second end, and the upper limit being when the adjustable volume limiter is set in a second position extending a maximum axial distance from the second end.

2. The engine system of claim 1, wherein the AVRmin ranges from 1 to 20 $m^{-1}$.

3. The engine system of claim 1, wherein a stopper is provided around an inner side surface of the interior of the prechamber proximate the first end of the prechamber.

4. The engine system of claim 1, further comprising:

an engine head, wherein the prechamber is formed in the engine head;

an engine block, wherein the engine cylinder is formed within the engine block; and a primary piston slidably positioned in the engine cylinder, wherein the main chamber is defined between the primary piston, the engine cylinder, and the engine head.

5. The engine system of claim 4, wherein the prechamber piston and the primary piston are slidable in parallel axial directions.

6. The engine system of claim 4, wherein a compression ratio of the engine cylinder is fixed.

7. The engine system of claim 4, wherein the main chamber comprises a clearance volume defined between the engine head and the primary piston when the primary piston is in a top dead center position within the engine cylinder, and wherein the interior of the prechamber has a volume that is less than 10 percent of the clearance volume.

8. An engine prechamber, comprising:

a body, comprising:

a first end and a second end at opposite axial ends of the body;

an inner side surface; and an interior defined between the first end, the second end, and the inner side surface;

a plurality of nozzles formed in the first end of the body;

a prechamber piston slidably disposed in the interior of the body;

a spring positioned between the second end of the body and the prechamber piston;

an ignition chamber in fluid communication with the interior of the body via an ignition chamber opening, wherein the ignition chamber opening is formed along the inner side surface of the body; and an adjustable volume limiter provided at the second end of the prechamber, wherein when the adjustable volume limiter is set in a first position, the adjustable volume limiter extends a first axial distance from the second end, and when the adjustable volume limiter is set in a second position, the adjustable volume limiter extends a second axial distance from the second end greater than the first distance.

9. The engine prechamber of claim 8, further comprising an ignition device provided in the ignition chamber, wherein the ignition device is held outside of the interior.

10. The engine prechamber of claim 8, further comprising a stopper provided around the inner side surface proximate the first end of the prechamber, wherein the inner side surface has an inner diameter greater than a diameter of the prechamber piston, and wherein the stopper extends a radial distance into the interior to define a reduced inner diameter of the interior that is less than the diameter of the prechamber piston.

11. The engine prechamber of claim 8, wherein a first side of the prechamber piston has a surface geometry that mates with an inner surface of the first end.

12. A method, comprising:

providing an engine comprising:

a prechamber in fluid communication with a main chamber of an engine cylinder via a plurality of nozzles located along a first end of the prechamber;

a primary piston slidably positioned in the engine cylinder; and a prechamber piston slidably positioned in the prechamber, wherein a variable volume is defined in an interior of the prechamber between the prechamber piston and the first end of the prechamber;

supplying a combustible mixture to the main chamber;

compressing the combustible mixture within the main chamber during a compression stroke of the primary piston to direct a portion of the combustible mixture through the plurality of nozzles into the prechamber;

using the portion of the combustible mixture directed into the prechamber to move the prechamber piston in a first axial direction to increase the variable volume in the prechamber;

igniting the portion of the combustible mixture in the prechamber using an ignition device in fluid communication with the variable volume in the prechamber;

jetting the ignited portion of the combustible mixture from the prechamber through the plurality of nozzles into the main chamber during an expansion stroke of the primary piston;

using a spring to move the prechamber piston in a second axial direction, opposite the first axial direction, to decrease the variable volume in the prechamber and to further eject the ignited portion of the combustible mixture out of the prechamber; and providing an adjustable volume limiter at the second end of the prechamber;

when the engine is operating in a first engine load range, setting the adjustable volume limiter in a first position, where the adjustable volume limiter extends a first distance from the second end; and when the engine is operating in a second engine load range, less than the first engine load range, setting the adjustable volume limiter in a second position, where the adjustable volume limiter extends a second distance from the second end greater than the first distance.

13. The method of claim 12, further comprising using an electronically controlled actuator to adjust the adjustable volume limiter between the first position and the second position.

14. The method of claim 12, wherein the primary piston operates in a four-stroke cycle, the four-stroke cycle comprising:

an exhaust stroke, wherein an exhaust valve to the main chamber is open and the primary piston moves towards the prechamber to push contents in the main chamber through the exhaust valve;

an intake stroke, wherein an intake valve to the main chamber is open and the primary piston moves away from the prechamber to receive the combustible mixture;

the compression stroke; and the expansion stroke.

15. The method of claim 14, wherein during the exhaust stroke and the intake stroke, the spring holds the prechamber piston in the prechamber to provide the variable volume with a minimum volume.

16. The method of claim 12, further comprising maintaining a fixed compression ratio of the engine cylinder is fixed.

17. The method of claim 12, wherein a stopper provided around the inner side surface proximate the first end of the prechamber, wherein the inner side surface has an inner diameter greater than a diameter of the prechamber piston, and wherein the stopper extends a radial distance into the interior to define a reduced inner diameter of the interior that is less than the diameter of the prechamber piston.

* * * * *